(12) United States Patent
Brown et al.

(10) Patent No.: US 8,857,577 B2
(45) Date of Patent: Oct. 14, 2014

(54) DAMPED BRAKE ROTOR

(71) Applicants: Ron T. Brown, Bloomfield Hills, MI (US); Bruce A. Smallwood, Chelsea, MI (US); Daniel M. Sandberg, Novi, MI (US); Mark B. Olson, Farmington Hills, MI (US); Kevin M. Thompson, Marshall, MI (US)

(72) Inventors: Ron T. Brown, Bloomfield Hills, MI (US); Bruce A. Smallwood, Chelsea, MI (US); Daniel M. Sandberg, Novi, MI (US); Mark B. Olson, Farmington Hills, MI (US); Kevin M. Thompson, Marshall, MI (US)

(73) Assignee: Brembo North America, Inc., Plymouth, MI (US)

( * ) Notice: Subject to any disclaimer, the term of this patent is extended or adjusted under 35 U.S.C. 154(b) by 0 days.

(21) Appl. No.: 13/721,269

(22) Filed: Dec. 20, 2012

(65) Prior Publication Data
US 2013/0180812 A1    Jul. 18, 2013

Related U.S. Application Data

(60) Provisional application No. 61/578,449, filed on Dec. 21, 2011.

(51) Int. Cl.
*F16D 65/12* (2006.01)
*B60T 1/00* (2006.01)
*F16D 65/10* (2006.01)
*F16D 65/00* (2006.01)

(52) U.S. Cl.
CPC .............. *F16D 65/127* (2013.01); *F16D 65/12* (2013.01); *F16D 65/0018* (2013.01)

USPC ............... 188/218 XL; 188/18 A; 188/218 R

(58) Field of Classification Search
CPC  F16D 2065/1328; F16D 65/12; F16D 65/123
USPC ............................. 188/218 XL, 218 R, 18 A
See application file for complete search history.

(56) References Cited

U.S. PATENT DOCUMENTS

| | | | |
|---|---|---|---|
| 2,844,229 A * | 7/1958 | Whitfield ................ 188/218 XL |
| 3,286,799 A | 11/1966 | Shilton | |
| 3,575,270 A | 4/1971 | Wageafuhrer et al. | |
| 3,718,210 A * | 2/1973 | Dernovshek et al. ... 188/218 XL |
| 3,907,076 A * | 9/1975 | Crossman et al. ...... 188/218 XL |
| 5,706,915 A * | 1/1998 | Shimazu et al. ............ 188/71.6 |
| 5,709,288 A * | 1/1998 | Riebe ...................... 188/218 XL |
| 5,855,257 A * | 1/1999 | Wickert et al. .......... 188/218 XL |
| 5,878,843 A | 3/1999 | Saum | |
| 6,241,053 B1 * | 6/2001 | Tahara et al. ................ 188/71.6 |

(Continued)

FOREIGN PATENT DOCUMENTS

| | | |
|---|---|---|
| DE | 25 37 038 A1 | 3/1977 |
| DE | 3811222 A1 | 10/1989 |

(Continued)

OTHER PUBLICATIONS

International Preliminary Report on Patentability re Int. Appl. No. PCT/US2012/070836 issued Jun. 24, 2014.

*Primary Examiner* — Vishal Sahni
(74) *Attorney, Agent, or Firm* — Marshall & Melhorn, LLC

(57) ABSTRACT

A damped brake rotor has at least one friction disk connected to a hat portion. At least one cavity in located in the friction disk. An insert is located within the cavity. A braze ring is located within the cavity and radially outward from the insert. A braze located within the cavity and radially outward from the braze ring.

31 Claims, 5 Drawing Sheets

(56) References Cited

U.S. PATENT DOCUMENTS

| | | | |
|---|---|---|---|
| 6,550,590 B1 * | 4/2003 | Ranganathan | 188/218 XL |
| 6,945,309 B2 | 9/2005 | Frait et al. | |
| 7,159,698 B2 * | 1/2007 | Banks et al. | 188/218 XL |
| 7,604,098 B2 | 10/2009 | Dessouki et al. | |
| 7,644,750 B2 | 1/2010 | Schroth et al. | |
| 7,775,332 B2 * | 8/2010 | Hanna et al. | 188/218 XL |
| 7,931,134 B2 * | 4/2011 | Mordukhovich | 192/52.6 |
| 7,937,819 B2 | 5/2011 | Hanna et al. | |
| 7,938,378 B2 | 5/2011 | Hanna et al. | |
| 7,950,441 B2 | 5/2011 | Hanna et al. | |
| 7,975,750 B2 | 7/2011 | Dessouki et al. | |
| 8,028,739 B2 | 10/2011 | Walker et al. | |
| 8,104,162 B2 | 1/2012 | Golden et al. | |
| 8,118,079 B2 | 2/2012 | Hanna et al. | |
| 8,163,399 B2 | 4/2012 | Schroth et al. | |
| 8,245,758 B2 | 8/2012 | Hanna et al. | |
| 2006/0076200 A1 | 4/2006 | Dessouki et al. | |
| 2007/0023240 A1 | 2/2007 | Dessouki et al. | |
| 2008/0185249 A1 | 8/2008 | Schroth et al. | |
| 2009/0020379 A1 | 1/2009 | Hanna et al. | |
| 2009/0020383 A1 | 1/2009 | Hanna et al. | |
| 2009/0022938 A1 * | 1/2009 | Hanna et al. | 428/101 |
| 2009/0050422 A1 | 2/2009 | Malott et al. | |
| 2009/0173585 A1 | 7/2009 | Kappagantu | |
| 2009/0260931 A1 * | 10/2009 | Ulicny et al. | 188/218 XL |
| 2009/0260932 A1 | 10/2009 | Hanna et al. | |
| 2009/0269575 A1 | 10/2009 | Hanna et al. | |
| 2010/0122880 A1 | 5/2010 | Hanna et al. | |
| 2010/0282550 A1 | 11/2010 | Schroth et al. | |

FOREIGN PATENT DOCUMENTS

| | | |
|---|---|---|
| EP | 0 717214 B1 | 7/1995 |
| FR | 2927389 B1 | 5/2010 |
| GB | 998453 | 7/1965 |
| GB | 1219821 A | 1/1971 |
| GB | 1395908 A | 5/1975 |
| GB | 1469115 A | 3/1977 |
| GB | 2125911 A | 3/1984 |
| WO | WO 03/019036 A1 | 3/2003 |
| WO | WO 2010008715 A2 | 1/2010 |

* cited by examiner

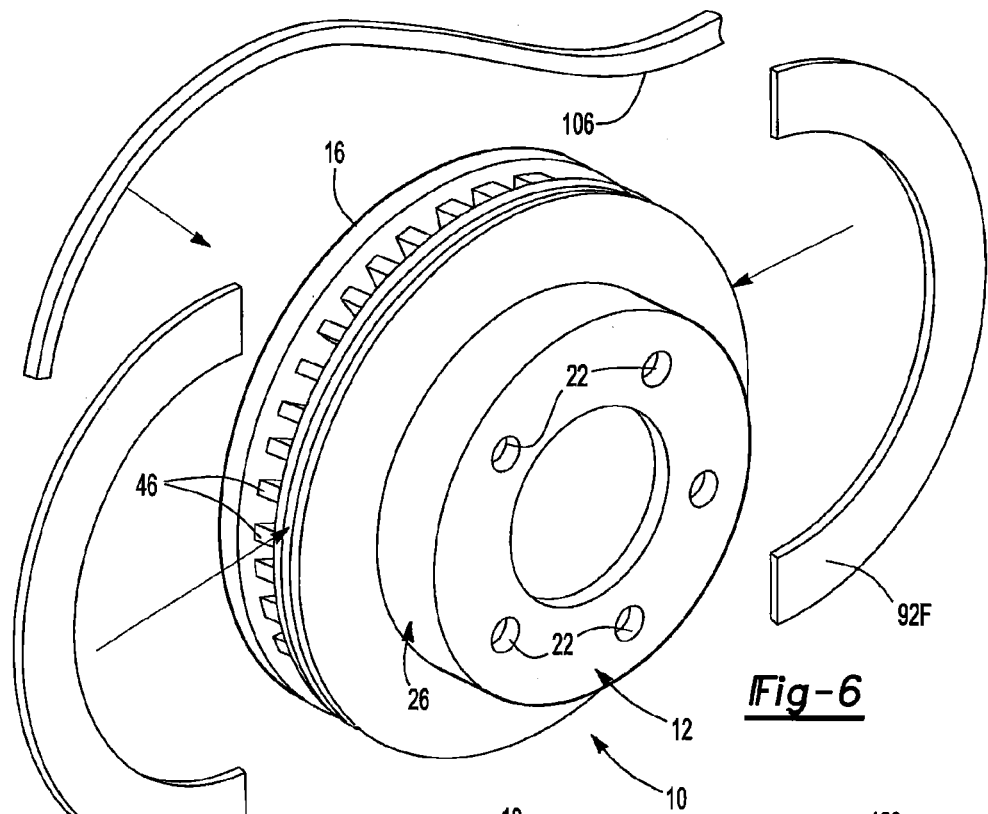
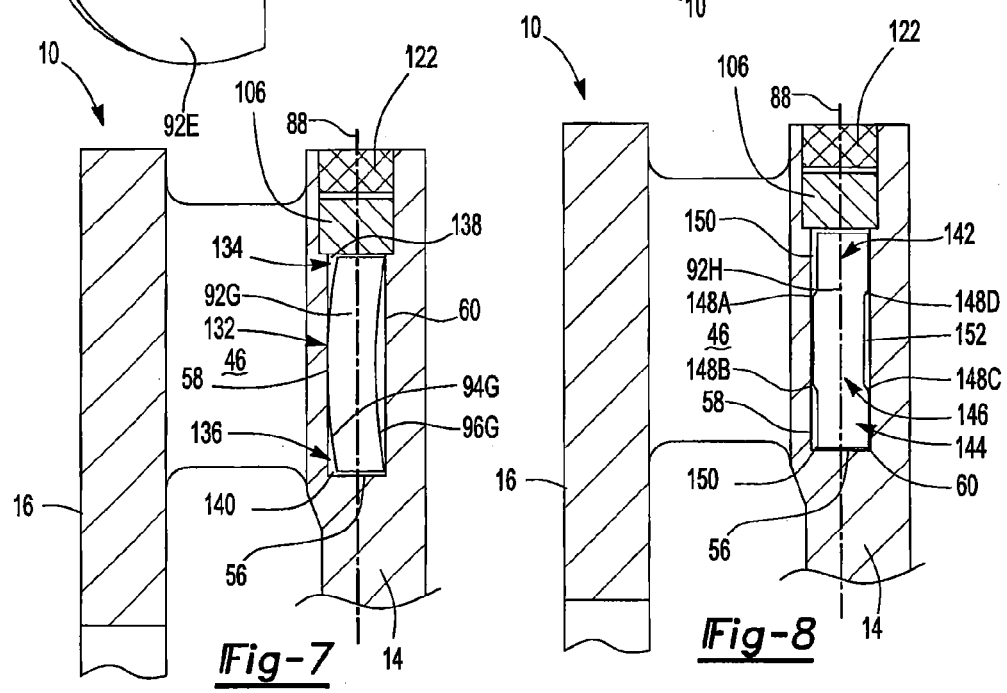

DAMPED BRAKE ROTOR

RELATED APPLICATIONS

This application claims benefit to U.S. Provisional Patent Application Ser. No. 61/578,449 filed on Dec. 21, 2011, which is fully incorporated by reference herein.

FIELD OF THE DESIGN

The design relates to a method and apparatus for damping an object, such as a brake rotor.

BACKGROUND

Brakes are common and well-known for many objects including vehicles. Almost as well-known as the brakes themselves are the problems associated with them. One of the most significant problems with brakes, particularly on vehicles, such as passenger vehicles, is noise. Brake noise has become one of the highest warranty problems for vehicle manufacturers as customers find it objectionable and disturbing.

Certain brakes, such as high performance brakes that may utilize special friction linings, may generate, or at least be perceived by customers to generate, an even greater amount of noise than regular brakes. It is desirable to minimize, or even eliminate, noise emanating from the brakes, regular or high performance, of a vehicle to reduce warranty issues and increase customer satisfaction.

SUMMARY

In one embodiment, a damped brake rotor has at least one friction disk connected to a hat portion. There is at least one cavity in the friction disk. An insert is located within the cavity. A braze ring is located within the cavity and radially outward from the insert. A braze is located within the cavity and radially outward from the braze ring.

In another embodiment, the brake rotor is damped by permitting the insert to move within the first groove. The groove is closed by the braze ring and then the braze ring is sealed in place with the braze. The braze ring prevents the braze from contacting the insert.

BRIEF DESCRIPTION OF THE DRAWINGS

The advantages of the present design will become readily apparent to those skilled in the art from the following detailed description when considered in the light of the accompanying drawings in which:

FIG. 3A is one embodiment of a detail view from FIG. 2;

FIG. 3B is another embodiment of a detail view from FIG. 2;

FIG. 6 is an exploded perspective view depicting another embodiment;

FIG. 7 depicts another embodiment of a detail of the rotor; and

FIG. 8 depicts another embodiment of a detail of the rotor.

DETAILED DESCRIPTION OF THE PREFERRED EMBODIMENTS

It is to be understood that the design may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
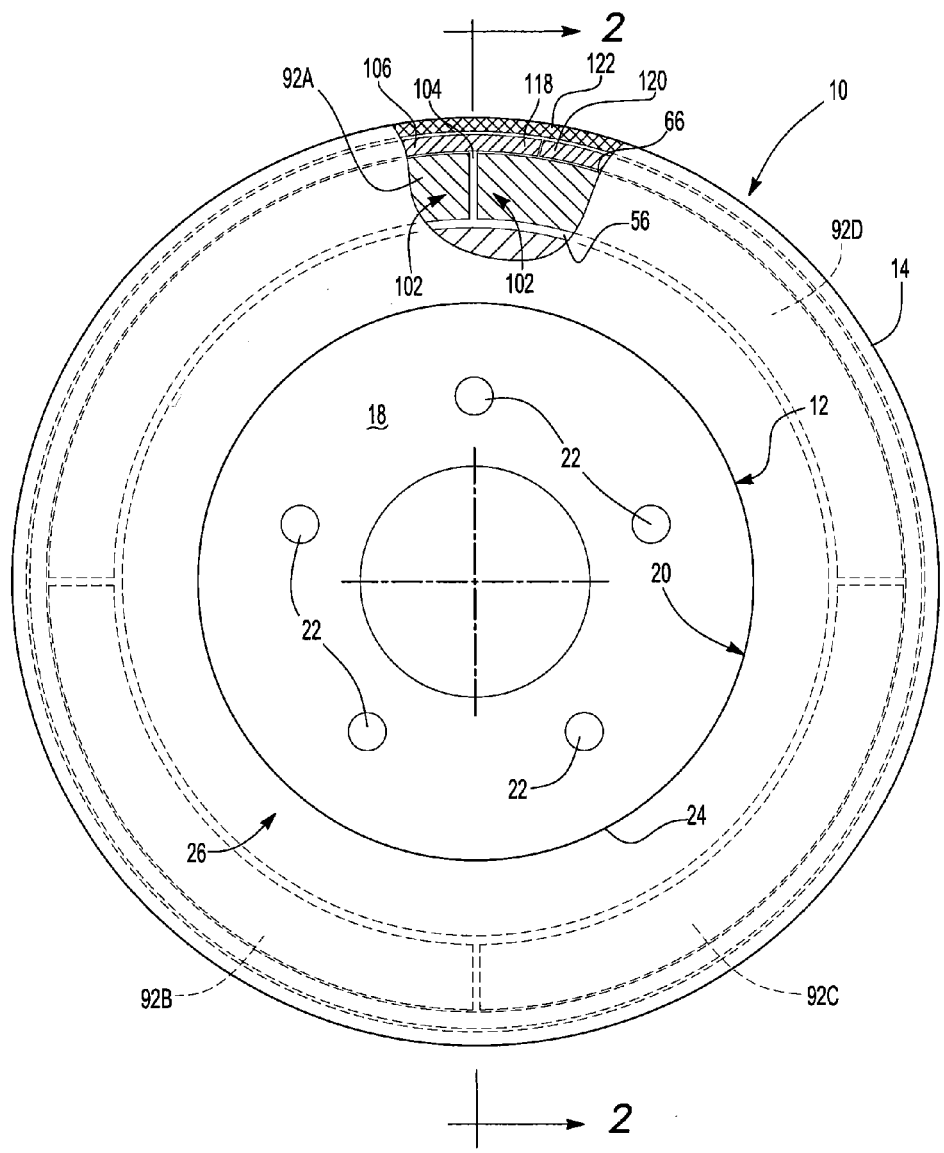
FIG. 1 is an elevation view of one embodiment of a vented brake rotor.
Figure 2:
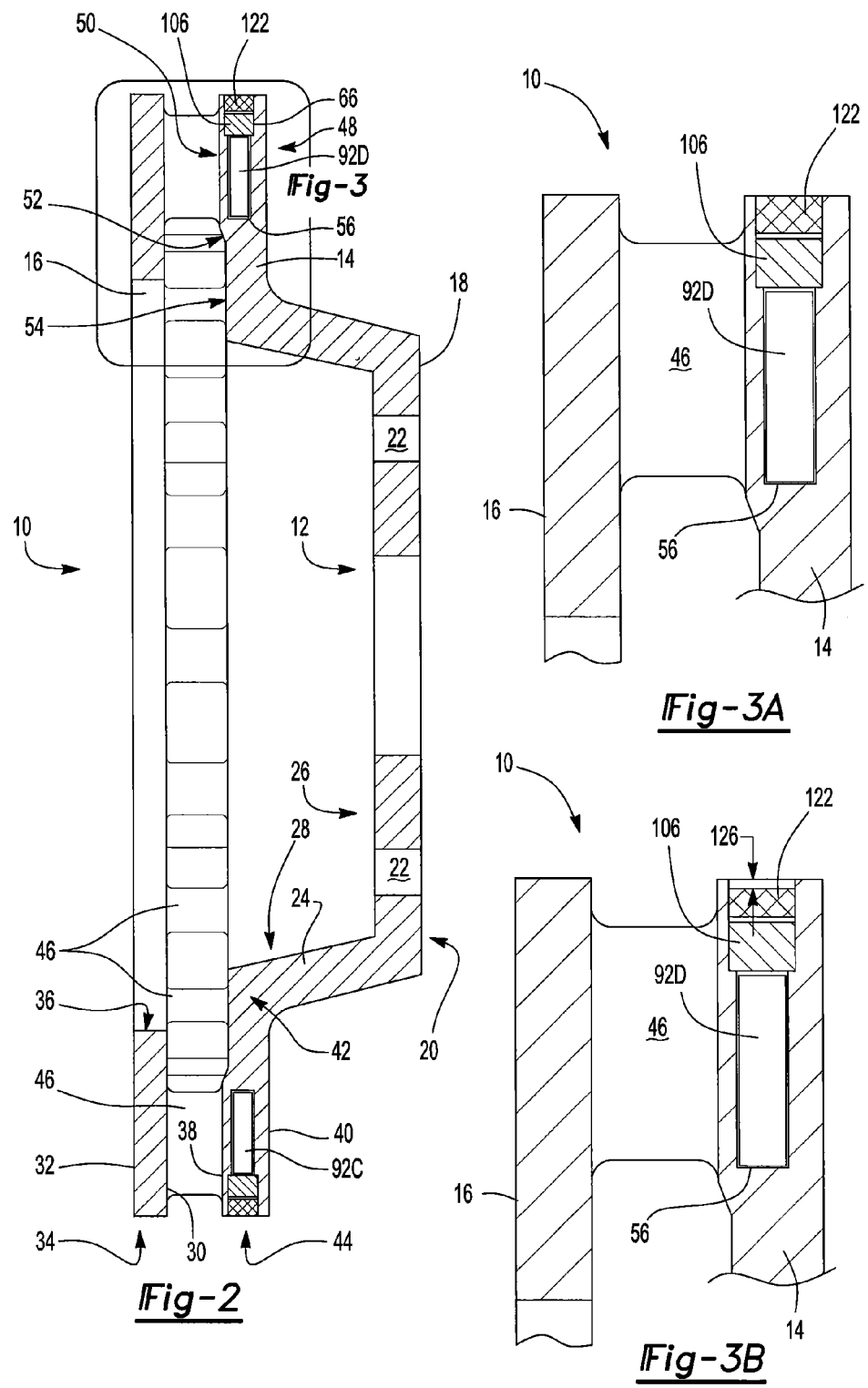
FIG. 2 is a view along line 2-2 from FIG. 1.

FIGS. 1 and 2 depict one embodiment of a disk brake rotor 10 comprising a center portion 12 and a first disk 14 and a second disk 16 extending from the center portion 12. While two disks 14, 16 are depicted as extending from the center portion 12, a single disk extending from the center portion 12 is also within the scope of the present concept. In either case, the disk or disks 14, 16 may be unitary and one-piece with the center portion 12, or they may be separate pieces that are attached later, such as by welding. An embodiment utilizing the first and second disks 14, 16 will be described herein.

The center portion 12 may be comprised of a planar plate 18 with a circular perimeter 20. The circular plate 18 preferably has a plurality of bolt holes 22 for receiving bolts (not shown) extending from a rotatable hub (not shown). The bolts extend through the plate 18 where nuts (not shown) are threaded onto the bolts to secure the rotor 10 to the hub.

A wall 24 extends from the circular perimeter 20 of the plate 18 in a perpendicular fashion. The wall 24 may be continuous or non-continuous with apertures for structures or weight savings.

Together, the center portion 12 and the wall 24 comprise a hat portion 26 of the rotor 10. The first and second disks 14, 16 extend substantially perpendicularly from an end portion 28 of the hat portion 26. The end portion 28 is approximately opposite the end of the wall 24 attached to the circular perimeter 20. Preferably, the first and second disks 14, 16 are generally parallel to one another and generally parallel to the plate 18 of the hat portion 26. The first and second disks 14, 16 typically are not planar with one another or with the plate 18.

The second disk 16 has a first surface 30 and a second surface 32. The two surfaces 30, 32 define a substantially constant thickness between them. The second disk 16 also has an outer diameter portion 34 and an inner diameter portion 36. The two diameter portions 34, 36 define between them a substantially constant thickness.

The first disk 14 also has a first surface 38 and a second surface 40. The first disk 14 also has an inner diameter portion 42 and an outer diameter portion 44. The first disk 14 outer diameter portion 44 is preferably radially equal to the second disk 16 outer diameter portion 34. The two inner diameter portions 36, 42 may be radially equal or offset from one another, the latter being depicted in FIG. 2.

A plurality of cooling vanes 46 extend between the first disk 14 and the second disk 16. The vanes 46 may be of any shape, size, or number and they may be positioned between the two disks 14, 16 other than as depicted in the figures. In the depicted embodiment, the vanes 46 extend between the first surface 30 of the second disk 16 and the first surface 38 of the first disk 14.

While a rotor 10 with vanes 46 is depicted and described herein, it is within the scope of the current design to utilize a non-vented, solid type rotor.

The first disk 14 defines an insert portion 48 between the first surface 38 and the second surface 40. In the depicted embodiments, at least a part of the insert portion 48 is located adjacent the outer diameter portion 44. However, the insert portion 48 may be located anywhere within the first disk 14, in the second disk 16 and/or in the hat portion 26.

In one embodiment, the insert portion 48 comprises a thickened area 50 between the first and second surfaces 38, 40. As shown in FIG. 2, the thickened area 50 begins at the outer diameter portion 44 and extends radially inwardly along the first surface 38. A transition area 52 is located between the thickened portion 50 and the portion 54 of the first disk 38 extending to the inner diameter portion 42. The transition area 52 may be such as a taper or angled surface. The second surface 40 may also define the thickened area, either alone or in conjunction with the first surface 38.

In another embodiment that is not depicted, the insert portion 48 does not need to be part of a thickened area between the first and second surfaces 38, 40. In this embodiment, no thickening is required. Instead, the insert portion 48 is located between the two surfaces 38, 40 and the two surfaces 38, 40 remain substantially parallel to one other from the outer diameter portion 44 to the hat portion 26 of the rotor 10.

Figure 3:
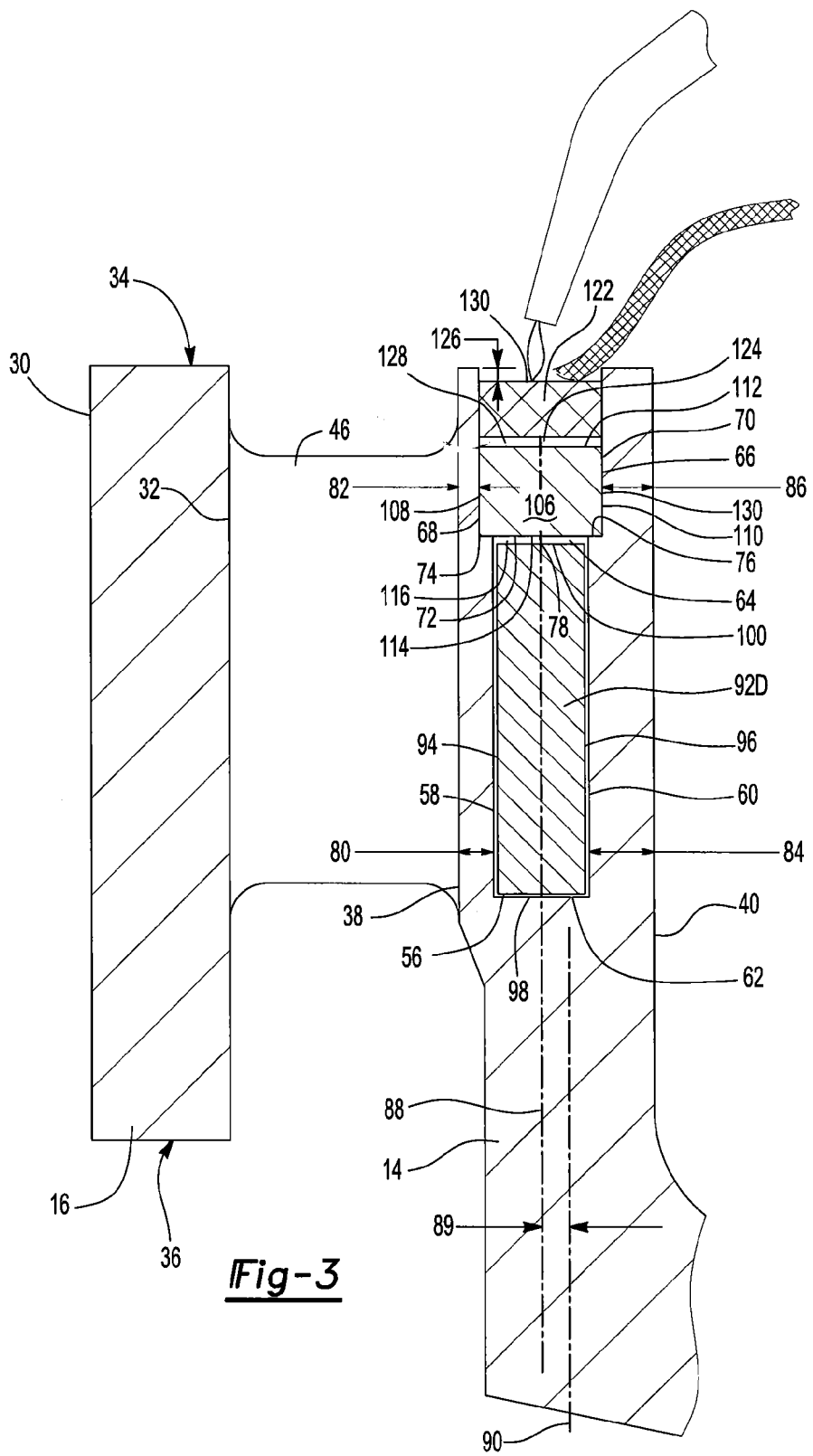
FIG. 3 is a portion of the rotor of FIG. 1.

Looking now at FIGS. 2 and 3, a cavity is located into the thickened portion 50 at a predetermined depth and width. Preferably, the cavity has a depth approximately equal to or less than the radial length of the thickened portion 50. The thickened portion 50 helps accommodate the cavity without comprising the first disk wall strength.

The cavity comprises a first groove 56. The groove 56 has first and second parallel surfaces 58, 60, and an end surface 62 perpendicular to the first and second surfaces 58, 60. The groove 56 has an opening 64 facing the outer diameter portion 44. Preferably, the first groove 56 extends continuously without interruption at the predetermined depth and width entirely around the first disk 14.

In one exemplary, non-limiting embodiment, the first groove 56 may have a width between 1 and 5 mm, preferably between 2 and 3 mm. In the same embodiment, the first groove 56 may have a depth between 10 and 30 mm, preferably between 15-25 mm. These widths and depths, however, may vary according to specific embodiments and rotor performance needs; the disclosed concept is not limited to these dimensions.

The cavity also comprises a second groove 66. The second groove 66 is located radially outward from the first groove 56. More particularly, the two grooves 56, 66 share an opening and are connected to one another as the first groove 56 opens into the second groove 66.

The second groove 66 has first and second parallel surfaces 68, 70 and an end portion 72 that is perpendicular to the first and second parallel surfaces 68, 70. The end portion 72 is comprised of first and second ledges 74, 76 separated by a gap 78. The first and second ledges 74, 76 extend continuously around the rotor 10 at the same radial distance. Further, the first and second surfaces ledges 74, 76 extend at a constant width with respect to one another around the rotor 10. The first and second ledges 74, 76 are continuous, unitary and integrally formed with the first disk 14.

The first and second parallel surfaces 68, 70 of the second groove 66 are parallel to, but non-planar with the first and second surfaces 58, 60 of the first groove 56. More particularly, as depicted in FIGS. 2, 3, 3A and 3B, it is preferred that the second groove 66 has a predetermined width that is greater than the width of the first groove 56. The first and second parallel surfaces 68, 70 extend uninterrupted to the outer diameter portion 44. The second groove 66 opens to the outer diameter portion 44.

The second groove 66 has a predetermined depth that may be less than the depth of the first groove 56. In one embodiment, the depth of the second groove 66 is approximately 25% to 75% of the first groove 56 depth. While the figures depict a second groove 66 that is shallower and wider than the first groove 56, the second groove 66 may be greater or equal in depth, and/or thinner or equal in width to the first groove 56.

The first surface 58 of the first groove 56 and the first surface 38 of the first disk 14 form a first thickness 80. The first surface 68 of the second groove 66 and the first surface 38 of the first disk 14 form a second thickness 82 that is less the first thickness 80, as best seen in FIG. 3.

The second surface 60 of the first groove 56 and the second surface 40 of the first disk 14 form a third thickness 84. The second surface 70 of the second groove 66 and the second surface 40 of the first disk 14 form a fourth thickness 86 that is less than the third thickness 84. The third thickness 84 is the greatest, followed by the fourth thickness 86, then the first thickness 80, then the second thickness 82.

The first and second grooves 56, 66 are aligned with one another along a common radially extending axis 88. The first disk 14 also has a radially extending axis 90. The groove axis 88 and the first disk axis 90 are parallel but nonplanar with one another. In other words, the groove axis 88 is located at an offset 89 from the first disk axis 90.

While the depicted embodiment depicts the axis 88 of the grooves 56, 66 as offset from the first disk axis 90, it is also possible that the axis 88 of the grooves 56, 66 is aligned with the first disk axis 90, for example, when there is no thickening.

The grooves 56, 66 may be machined and/or cast into the first disk 14. It can also be appreciated that the grooves 56, 66 can be similarly created anywhere in the first disk 14 or anywhere in the second disk 16, including the inner and outer diameter portions 34, 36, 42, 44.

Preferably, the first and second disks 14, 16 and hat portion 26 are cast iron, but they may be made of other materials in whole or in part such as composites like reinforced carbon-carbon or ceramic matrix composites. When cast together, the first and second disks 14, 16 and the hat portion 26 are one piece and unitary. However, the rotor 10 may be comprised of multiple pieces that are fixed together, such as by welding. Exemplary materials for the rotor include GL H 05 and GL B 01 cast iron.

At least one insert 92 is located within the first groove 56 of the rotor 10. The insert 92 is preferably constructed of a metal material. Metal materials from which the insert 92 may be constructed include, but are not limited to 1004 to 1008 SAE steel, which are both known as mild steel with a carbon content of approximately 0.5% to 0.1%.

Regardless of the materials mentioned above, it is preferable that the insert 92 have thermal conductivity and expansion coefficients similar to the brake rotor 10. By matching the thermal conductivity and expansion coefficients of the brake rotor 10 and the insert 92, the risk of the brake rotor 10 cracking, because the insert 92 and/or rotor 10 have conducted heat or expanded at different rates, can be minimized. However, it is within the scope of the present concept for the at least one insert 92 to have a thermal conductivity and/or expansion coefficient that is dissimilar to the brake rotor 10.

In the depicted embodiment, the insert 92 has first and second parallel walls 94, 96 that are parallel one another and third and fourth walls 98, 100 that are parallel one another, but perpendicular to walls 94, 96. The walls 94-100 define a substantially rectangular cross-section of the insert 92. It should be noted, however, that inserts 92 of any shape, size, length, or cross section may be used.

Figure 4:
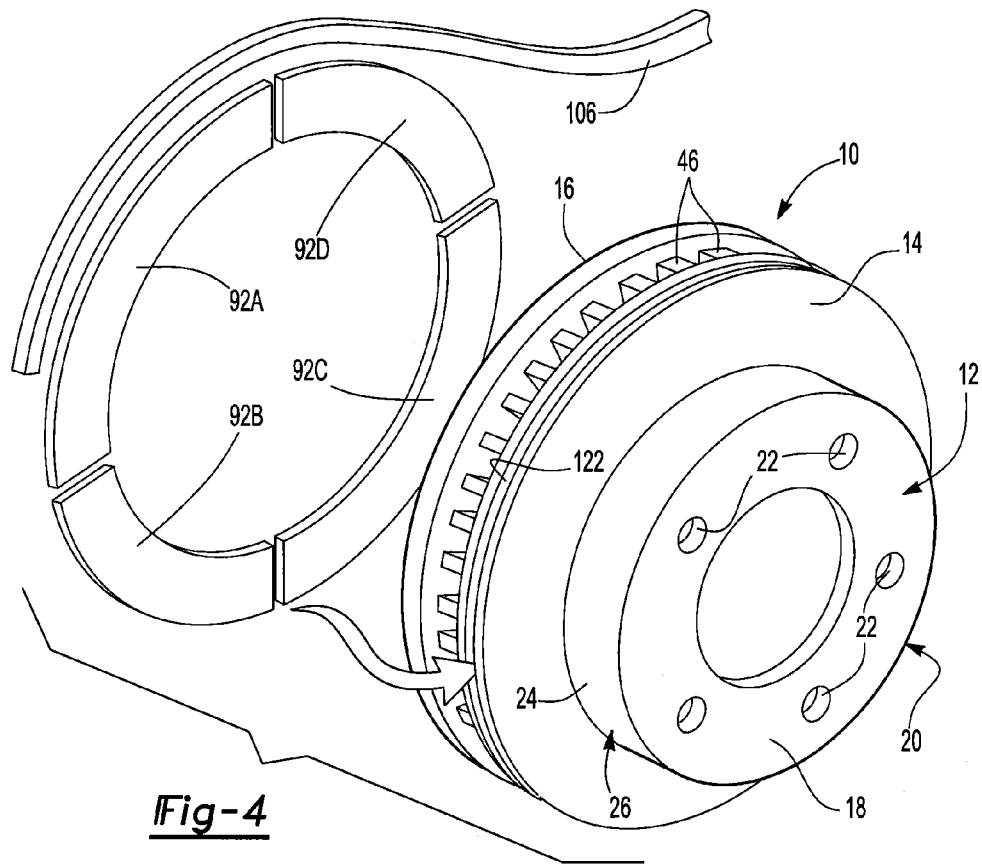
FIG. 4 is an exploded perspective view depicting on embodiment of a rotor, inserts and a braze ring.
Figure 5:
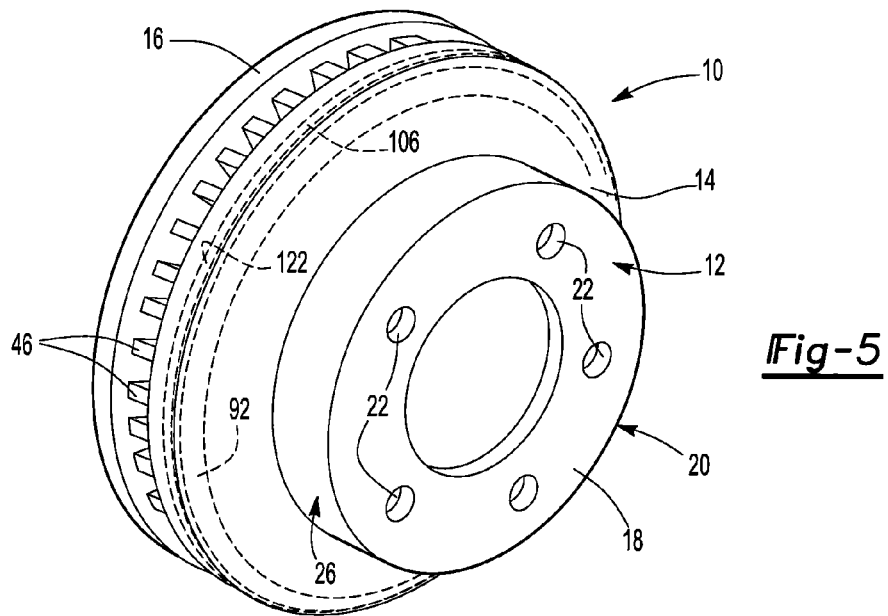
FIG. 5 is an assembled view of the structures in FIG. 4.

As shown in FIG. 4, the insert 92 may comprise four identical segments 92A, 92B, 92C, 92D each extending in an arcuate fashion approximately ninety degrees about the rotor 10. While identical segments 92A, 92B, 92C, 92D are depicted, segments of various combinations of arc lengths are also permissible. Further, the number of segments can vary from the four that are depicted. By way of example only, FIG. 6 depicts an embodiment utilizing two inserts 92E, 92F. In FIG. 6, the two inserts 92E, 92F each extend approximately 180 degrees.

In any embodiment, each insert 92 terminates in an end portion 102 and the end portions 102 preferably selectively abut one another when installed in the first groove 56. The end portions 102 may be selectively separated from one another by a changing gap, or the gap may be constant or there may be no gap at all. In a preferred embodiment, the end portions 102 are separated by a gap 104 of approximately 0.1 to 2 mm, as shown in FIG. 1. In a more preferred embodiment, the gap 104 is approximately 0.4 mm.

In this embodiment, each insert 92 has a preferred thickness and flatness. In a preferred embodiment, the thickness of the insert 92 is between 1 and 4 mm, with good results achieved between 2 and 3 mm. Preferably, the thickness does not deviate more than +/−0.0245 mm through the insert 92. In the same preferred embodiment, the flatness of the insert 92 does not deviate more than 0.1016 mm.

The length of the insert 92 should be equal to or less than the depth of the first groove 56. By way of example only, inserts 92 having a length between 5 and 30 mm might be used. Positive results were achieved with insert 92 lengths between 10 and 25 mm.

The insert 92 is a friction damping insert, which provides mechanical damping of energy via the absorption of that energy through sliding friction. The friction is developed by the relative motion of the insert 92 within the first groove 56. More particularly, the friction is developed by the relative motion of the first and second walls 94, 96 with the first and second surfaces 58, 60 of the groove 56. Friction is also developed between the third wall 98 and the end surface 62 of the groove 56 and the fourth wall 100 and a braze ring 106, described in greater detail below.

Damping occurs when the insert 92 vibrates, which may be caused by braking surfaces being applied to disks 14 and/or 16, and its kinetic energy is converted into heat by the friction mentioned above. By damping the energy in the vibrating insert 92, brake squeal is minimized and/or reduced.

Vibration amplitude is highest adjacent the outer perimeter portion of the brake rotor 10 for most rotor modes. Further, vibration is highest in the outer perimeter portion 44 of the outer, or first, brake disk 14 for most rotor modes. Therefore, it is desirable to locate the insert 92 near the outer perimeter portion 44 of the first brake disk 14. The insert 92, however, may be located in any portion of any disk 14, 16 or area of the rotor 10.

In view of the above, it can be appreciated that it is desirable for there to be a predetermined gap between the walls of the insert and the surfaces of the cavity. The gap should not be so large that the insert is permitted to rattle, however, it must be large enough that the insert can move with respect to the cavity to create the frictional damping.

The braze ring 106 is located in the second groove 66. The braze ring 106 may be constructed of a metallic material, but other materials are permissible. In the preferred embodiment, the braze ring 106 is a 1004 steel, known as mild steel, that has been soft temper annealed so that is can be efficiently shaped and sized to fit within the second groove 66.

In the preferred embodiment, the braze ring 106 may be such as a wire. The dimensions of the braze ring 106 may be adapted to the dimensions of the second groove 66. In one embodiment, the braze ring 106 may be approximately 3 mm deep by 3.5 mm wide, thus providing it with a rectangular or square cross section. Regardless of the dimension above, it is preferable that the braze ring 106 be of sufficient dimension that braze 122, discussed below, is not permitted to burn through, or otherwise circumvent, the ring 106 upon its application.

As shown in FIGS. 3, 3A and 3B, the braze ring 106 has a rectangular cross section defined by first and second side walls 108, 110 that are parallel one another and third and fourth upper and lower walls 112, 114 that are parallel one another. The first and second walls 108, 110 are in direct, continuous contact with the first and second surfaces 68, 70 of the second groove 66 from the ledges 74, 76 to the third wall 112. Preferably, the braze ring 106 has a slight interference fit with the second groove 66 to help secure it in place and minimize any noise it might generate by rattling. It is also preferred that the braze ring 106 lay within the second groove 66 flat against the ledges 74, 76 so that the third wall 112 presents an even surface as it extends around the rotor 10. A gap 116 may exist between the fourth wall 114 of the braze ring 106 and the insert 92.

The braze ring 106 may be comprised of a plurality of pieces joined at their ends or that remain not joined. Preferably, the braze ring 106 is a unitary structure with a first end 118 and a second end 120, which can be appreciated from FIG. 1. The first and second ends 118, 120 of the ring 106 may be joined and fixed together or the two ends 118, 120 may remain not joined and either directly abutting one another or with a gap between them. The braze ring 106 contains the insert 92 and prevents it from moving out of the first groove 56. Further, the braze ring 106 functions as an additional surface upon which the insert 92 can frictionally engage. Additionally, the braze ring 106 is a seal against a braze 122, described in additional detail below, from reaching the insert 92 and potentially fixing it in place. In other words, the braze ring 106 functions to decouple the braze 122 from the insert 92. Further, the braze ring 106 prevents pinching of the insert 92 as the braze cools. The braze ring 106 also forms a pocket 124 in the second groove 66 into which the braze 122 is located. Stated differently, the braze ring 106 receives and supports the braze 122 so that the braze 122 does not have to span the distance between groove surfaces in an otherwise unsupported fashion.

The braze ring 106 contacts and rests directly upon the first and second ledges 74, 76 of the second groove 66. The braze ring 106 spans the gap 78 between the first and second ledges 74, 76.

As shown in FIG. 3, the braze 122 is located above the braze ring 106 in the second groove 66. The braze 122 may completely fill the second groove 66 to the outer diameter portion 44, as shown in FIG. 3A. Alternatively, the braze 122 may only partially fill the second groove 66 leaving a gap 126 between the outer diameter portion 44 as shown in FIG. 3B.

In both FIGS. 3A and 3B, a gap 128 is depicted between the braze ring 106 and the braze 122. It is permissible for this gap 128 to be removed and for the braze 122 to directly and completely contact the third surface 112 of the braze ring 106; alternatively, the braze 122 may selectively contact the braze ring 106, thus providing for gaps 128 that are spaced from one another.

A machining process may be used to smooth an outer surface 130 of the braze 122 so that the braze outer surface 130 has the same radial dimension as the outer diameter portion 44.

While a braze 122 is depicted in the figures and described above, other materials and processes capable of joining and strengthening the first and second surfaces 58, 60, 68, 70 together, and that is capable of withstanding high loads, high temperatures and centrifugal forces may be used. If machining is required, the material should also be able to be machined. The material should also be able to seal the insert 92 from environmental conditions. Welding is a viable alternative. The weld may be continuous or it may be such as a stitch-type weld. Other materials, together or alone from welding, may be used. For example, a putty, such as ceramic metallic putty, and/or snap rings may be utilized.

A silicon bronze braze 122 may be used as it meets the criteria above. Silicon bronze is a high-strength, highly corrosion resistant material with nonmagnetic properties. Typically, silicon bronze is comprised of approximately 97% copper, 2% silicon and approximately 1% of other alloys.

In one embodiment, a silicon bronze braze of approximately 10% helium and 90% argon, with a wire of approximately 0.889 mm on a Lincoln Power Wave 455 welder was utilized with good results. Those skilled in the art will recognize however that the gas types and amounts, as well as the wire size, are two factors in achieving good braze results. Other factors include, but are not limited to, where the braze is started and stopped, and the pattern, if any, utilized in the braze. Regardless of the joining material utilized or how it is applied, it is preferred that the material fuse with the first and second surfaces 68, 70 of the second groove 66.

FIG. 7 depicts an alternative embodiment with the same features as the embodiment of FIG. 3, but with a variation on the insert. In FIG. 7, an insert 92G is depicted where the first wall 94G is curvilinear. In the depicted embodiment, the first wall 94G has a generally convex shape. The convex shape may comprise all or some of the wall 94G. The convexly shaped wall 94G extends toward the first surface 58. The wall 94G preferably selectively contacts the first surface 58, such at apex 132 of the wall 94G. With other shapes and designs of wall 94G, other and/or additional parts of the wall 94G contact the first surface 58.

When the wall 94G is convex, it may extend away from the first surface 58 at upper and lower portions 134, 136 of the first groove 56. An upper gap 138 and a lower gap 140 are created between the wall 94G and the first surface 58. The gaps 138, 140 may be equal, they may differ all the time or they may selectively differ.

The insert second wall 96G may be parallel with the first wall 94G, and thus curvilinear, or it may be parallel with the second surface 60, or any variation in between. When wall 96G is parallel to the first wall 94G, the walls 94G and 96G define between them a constant thickness of the insert 92G.

Wall 96G may be such as concave, as shown in FIG. 7, or only concave in part. In FIG. 7, wall 96G and surface 60 define between them a gap of varying dimension. Preferably, wall 96G at least selectively contacts surface 60 at two points at the upper and lower portions 134, 136 of the groove 56. Other shapes and designs of wall 96G may result in the wall 96G contacting the surface 60 at fewer, additional and/or different areas.

FIG. 8 depicts another embodiment to those described above. In FIG. 8, insert 92 H has an upper portion 142 and a lower portion 144 where the two portion 142, 144 bound a central portion 146. The upper portion and lower portions 142, 144 are substantially axially aligned with one another and planar. The portions 142, 144 may be aligned with axis 88.

The central portion 146 may be offset from axis 88 and the upper and lower portions 142, 144. In the depicted embodiment, the central portion 146 is offset toward the first surface 58 of the first groove 56. It may be appreciated, however, that the central portion 146 can be offset toward the second surface 60.

The offset central portion 146 may be formed through several angled transitions 148A-D from the upper and lower portions 142, 144. In FIG. 8, the transitions 148A-D are depicted as being curvilinear and substantially equal angles, however, it is possible for the transitions to be formed more like angled steps with sharper angles that may or may not be equal.

The depicted embodiment shows the central portion 146 directly adjacent, or in contact with, or at least selective contact with, the first surface 58. The central portion 146 defines a flat that may be in contact with the first surface 58. The flat may extend approximately a third of insert 92H, with the upper and lower portions 142, 1444 comprising the remaining two thirds of the insert 92H.

Gaps 150 may exist between the upper and lower portions 142, 144 and the first surface 58. The gaps 150 may be of constant dimension or they may vary as the insert 92H moves within the groove 56.

The upper and lower portions 142, 144 may be in selective contact with the second surface 60 of the groove 56, as shown in FIG. 8. A gap 152 separates the upper and lower portions 142, 144. The gap 152 also selectively separates the central portion from the second surface 60.

The insert embodiments depicted in FIGS. 7 and 8 assist in accommodating dimensional tolerances for the groove 56 and the insert 92. More particularly, the curvilinear shape of inserts 92G, 92H imbue a flexibility to them that permits them to adapt to a first groove 56 that may not be manufactured to a preferred dimension. Additionally or alternatively, the inserts 92G, 92H may be used if the inserts themselves are not manufactured to a preferred dimension.

The above-described design is adaptable to all brake rotors and mechanisms in need of damping. It has been found that the design works well despite high thermal cycling, high speed braking events and the forces and temperatures associated with both. The damping made available by the design is typically at least one order of magnitude higher and broadband across the rotor vibration modes compared to rotors without the design. As a result, the design is very effective at reducing, or eliminating, brake squeal.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A damped brake rotor, comprising:
    at least one friction disk connected to a hat portion, said friction disk and said hat portion sharing a vertical axis;
    a first groove in said friction disk, said first groove having a vertical axis that is horizontally offset from said friction disk and said hat portion vertical axis;
    an insert located within said first groove;
    a braze ring located within a second groove radially outward from said insert;
    a braze located within said second groove radially outward from said braze ring.

2. The damped brake rotor of claim 1, wherein said at least one friction disk transitions to an outboard thickened area, said thickened area defining an insert portion.

3. The damped brake rotor of claim 2, wherein said first groove is located within said thickened area.

4. The damped brake rotor of claim 3, wherein said first groove has first and second parallel surfaces, an end surface perpendicular to said first and second parallel surfaces and an opening.

5. The damped brake rotor of claim 3, wherein first groove extends continuously about said at least one friction disk.

6. The damped brake rotor of claim 3, wherein said first groove has a width between approximate 1 and 5 mm and a depth between approximately 10 and 30 mm.

7. The damped brake rotor of claim 4, wherein said first and second grooves share said opening.

8. The damped brake rotor of claim 3, wherein said second groove is comprised of first and second parallel surfaces and first and second unitarily formed ledges, wherein said ledges are separated by a gap, said ledges are perpendicular to said first and second parallel surfaces and said ledges extend continuously about said at least one friction disk.

9. The damped brake rotor of claim 3, wherein said second groove is wider than said first groove and said first groove is deeper than said second groove.

10. The damped brake rotor of claim 3, wherein a wall thickness in said insert portion on one side of said second groove is less than a wall thickness in said insert portion on an opposite side of said second groove and a wall thickness in said insert portion on one side of said first groove is less than a wall thickness in said insert portion on an opposite side of said first groove.

11. The damped brake rotor of claim 3, wherein said first and second grooves are radially aligned with one another.

12. The damped brake rotor of claim 1, wherein said insert has a thermal conductivity and expansion coefficients similar to the at least one friction disk.

13. The damped brake rotor of claim 1, wherein said insert has a rectangular cross-section.

14. The damped brake rotor of claim 1, wherein said insert is comprised of arcuate segments located about said at least one friction disk.

15. The damped brake rotor of claim 14, wherein said insert segments are separated from one another by a gap.

16. The damped brake rotor of claim 1, wherein said insert has a thickness between approximately 1 and 4 mm.

17. The damped brake rotor of claim 8, wherein said braze ring rests on said ledges, spans a gap between said ledges and seals said first groove.

18. The damped brake rotor of claim 1, wherein a gap exists between said braze ring and said insert.

19. The damped brake rotor of claim 3, wherein said braze ring is continuous and unitary within said second groove about said at least one friction disk.

20. The damped brake rotor of claim 1, wherein a gap is located between said braze and said braze ring.

21. The damped brake rotor of claim 1, wherein at least one wall of said insert is curvilinear.

22. The damped brake rotor of claim 3, wherein said at least one wall of said insert is convex with an apex in selective engagement with a wall of said first groove.

23. The damped brake rotor of claim 11, wherein said insert has two portions bounding a central portion, wherein said central portion has an axis offset from an axis of said two portions and said vertical axis of said first groove.

24. A damped brake rotor, comprising:
at least one friction disk connected to a hat portion, said at least one friction disk having an outer friction surface and an inner surface parallel to said outer friction surface;
at least one cavity between said outer friction surface and said inner surface, said cavity comprising radially aligned first and second grooves continuously extending about said at least one friction disk, said first groove having a rectangular cross-section;
an insert with a rectangular cross-section located within said first groove for movement therein;
a braze ring located within said second groove directly radially outward from said insert to close said insert within said first groove; and
a braze located within said second groove;
wherein a wall thickness in an insert portion on one side of said second groove is less than a wall thickness in said insert portion on an opposite side of said second groove and a wall thickness in said insert portion on one side of said first groove is less than a wall thickness in said insert portion on an opposite side of said first groove.

25. The damped brake rotor of claim 24, wherein said first groove has first and second parallel surfaces, an end surface perpendicular to said first and second parallel surfaces and an opening.

26. The damped brake rotor of claim 25, wherein said first and second grooves share said opening.

27. The damped brake rotor of claim 26, wherein said second groove is comprised of first and second parallel surfaces and first and second unitarily formed ledges, wherein said ledges are separated by a gap defining said opening, said ledges are perpendicular to said first and second parallel surfaces and said ledges extend continuously about said at least one friction disk.

28. The damped brake rotor of claim 24, wherein said second groove is wider than said first groove and said first groove is deeper than said second groove.

29. The damped brake rotor of claim 27, wherein said braze ring rests on said ledges, spans said gap between said ledges and seals said first groove from said second groove.

30. A damped brake rotor, comprising:
at least one friction disk connected to a hat portion, said friction disk and said hat portion sharing a vertical axis;
a first groove in said friction disk, said first groove having a vertical axis horizontally offset from said friction disk and hat portion vertical axis;
an insert located within said first groove;
a braze ring located within a second groove radially outward from said insert;
a braze located within said second groove and radially outward from said braze ring;
wherein a wall thickness in said at least one friction disk on one side of said first groove is less than a wall thickness on a radially opposite side of said first groove.

31. The damped brake rotor of claim 30, wherein a wall thickness on one side of said second groove is less than a wall thickness on a radially opposite side of said second groove.

* * * * *